United States Patent [19]

Danielli

[11] Patent Number: 5,205,047
[45] Date of Patent: Apr. 27, 1993

[54] METHOD AND APPARATUS FOR DYNAMICALLY CHECKING DIMENSIONS OF MECHANICAL PARTS

[75] Inventor: Franco Danielli, Zola Predosa, Italy

[73] Assignee: Marposs Societa' per Azioni, S. Marino di Bentivoglio, Italy

[21] Appl. No.: 807,871

[22] PCT Filed: Mar. 14, 1991

[86] PCT No.: PCT/EP91/00483
§ 371 Date: Jan. 21, 1992
§ 102(e) Date: Jan. 21, 1992

[87] PCT Pub. No.: WO91/19162
PCT Pub. Date: Dec. 12, 1991

[30] Foreign Application Priority Data
May 30, 1990 [IT]  Italy .................................. 3527 A/90

[51] Int. Cl.$^5$ .............................................. G01B 7/28
[52] U.S. Cl. ........................................ 33/542; 33/542.1; 33/555.1
[58] Field of Search ............. 33/542, 543, 544, 544.1, 33/544.2, 551, 552, 553, 554, 555.1, 283, 544.3, 544.5, 542.1

[56] References Cited

U.S. PATENT DOCUMENTS

| | | | |
|---|---|---|---|
| 4,167,066 | 9/1979 | Cooper et al. | 33/543 X |
| 4,884,346 | 12/1989 | Cook . | |
| 5,083,384 | 1/1992 | Possati et al. | 33/542 |

FOREIGN PATENT DOCUMENTS

| | | |
|---|---|---|
| 0409267 | 1/1991 | European Pat. Off. . |
| 0253078 | 1/1988 | Fed. Rep. of Germany ........ 33/542 |
| 61-253403 | 11/1986 | Japan . |
| WO89/03507 | 4/1989 | PCT Int'l Appl. . |
| WO89/04455 | 5/1989 | PCT Int'l Appl. . |
| 2126730 | 3/1984 | United Kingdom . |
| 2167862 | 6/1986 | United Kingdom . |

*Primary Examiner*—Harry N. Haroian
*Attorney, Agent, or Firm*—Stevens, Davis, Miller & Mosher

[57] ABSTRACT

A method for checking dimensions of parts foresees the use of a gauging head (2) with at least a movable feeler (14) that contacts the surface (6) of the part (4) to be checked and a transducer (20) that provides a signal responsive to the position of the feeler (14). The checking, that is performed dynamically in correspondence with one or more checking locations, involves mutual movements between the head (2) and the part (4) and a sliding between the movable feeler (14) and the surface (6).

In order to eliminate malfunctions introduced by frictional forces arising during the sliding, the method includes performing two scanning motions in correspondence with each checking location, according to two opposite directions, detecting values of the signal of the transducer (20) for each scanning motion, and averaging the detected values to obtain a value representative of the dimension to be checked, or of its deviation from a nominal value.

15 Claims, 2 Drawing Sheets

METHOD AND APPARATUS FOR DYNAMICALLY CHECKING DIMENSIONS OF MECHANICAL PARTS

Technical Field

The present invention relates to a method for checking dimensions of a mechanical part by means of a checking head including a casing, at least a feeler movable with respect to the casing and adapted to contact a surface of the part, and transducer means for providing a signal responsive to the position of the feeler, the method comprising the steps of controlling a mutual displacement between the checking head and the part so as to obtain a first mutual sliding motion between the feeler and the surface of the part, towards a portion to be checked, along a determined path; detecting a first passage of the feeler at the portion to be checked; and detecting the signal provided by the transducer means in correspondence with said first passage.

The invention also regards an apparatus for automatically checking linear dimensions of a mechanical part, with a checking head comprising a casing, at least a feeler movable with respect to the casing and transducer means for providing a signal responsive to the position of the feeler with respect to the casing, driving means for obtaining a first mutual displacement between the checking head and the part along a determined path, processing and control means connected to the transducer means and the driving means for controlling said mutual displacements, and for performing a first detection and processing of the signal of the transducer means.

BACKGROUND ART

Dimensional checkings performed by contacting mechanical parts—by means of heads having feelers contacting the surface of the part—involve sliding motions between the feeler and the surface for arranging the feeler in correspondence with a portion to be checked. In particular, these checkings can be carried out in dynamic way, i.e. the position of the movable feeler can be measured during said sliding motions, that may be manually or automatically controlled. For example, in connection with dynamic checkings it may be foreseen to detect, by means of mechanical or electric datums, the passage of the feeler along a predetermined portion to be checked, or to locate this portion depending on the output signals of the head during the sliding motions.

A simple manual checking of this type is carried out by a plug gauge, for example like that described in the U.S. Pat. No. 4 884 346, that is inserted into a hole, the diameter of which must be checked, and advanced up to a depth defined by a flange. During the advance two feelers slide on the hole surface, resiliently urged by a spring and by the structure of the arm-set, that also comprises transducer means.

A similar device, in which the transducer means are obtained by strain gages, is described in international application WO-A-89/03507, and can be used for checkings of automatic type, according to a method corresponding to the prior art portion of claim 1, in which the plug gauge is arranged on a slide and is displaced by it from a rest position to a measurement position.

In addition to plug gauges for internal dimensions like those mentioned above, there are many known devices and instruments with gauging heads of contacting type featuring sliding motions between feelers and surfaces. As an example only, it is possible to mention snap gauges for external diameters used in apparatuses like that described in international application WO-A-89/04455, featuring feelers that are displaced into contact with cylindrical external surfaces and caused to slide on said surfaces towards portions to be checked, located by mechanical datums.

In each of the above mentioned cases, the positioning of the feeler (or the feelers) on a surface of the part takes place through a sliding motion of the feeler on the surface along a determined direction or path. It is evident that the friction arising through said sliding motion, although limited in view of the particular shape and material of the feeler, cannot be eliminated. The resulting strains transmitted to the elements of the gauging heads can cause malfunctions due to flexures in the movable arm-set and/or strains in the transducer elements, for example when the latter are obtained by strain gages. Principally, repeatability errors of the heads can occur, due also to differences in the surface finishing of the different parts, said errors being difficult or impossible to evaluate.

The influence of these errors can be particularly high in high precision apparatuses that comprise very sensitive gauging heads, with arm-sets having small dimensions and low weight.

DISCLOSURE OF INVENTION

An object of the present invention is to obtain a measurement method, of contacting type, enabling to overcome the drawbacks inevitable in the known methods.

A further object of the invention is to provide an automatic checking apparatus, of contacting type, permitting the use of said method.

These and other objects are reached by a method according to claim 1 and an apparatus according to claim 12. The method and the apparatus provide the main result of carrying out checkings of contacting types on mechanical parts in a simple and reliable way and with high accuracy and repeatability, because undesired effects, that may be caused by the friction between the feelers and the surfaces of the parts to be checked, are rendered negligible.

BRIEF DESCRIPTION OF DRAWINGS

The invention is now described in detail with reference to the enclosed sheets of drawings, given by way of non-limiting example, wherein.

BEST MODES FOR CARRYING OUT THE INVENTION

Figure 1:
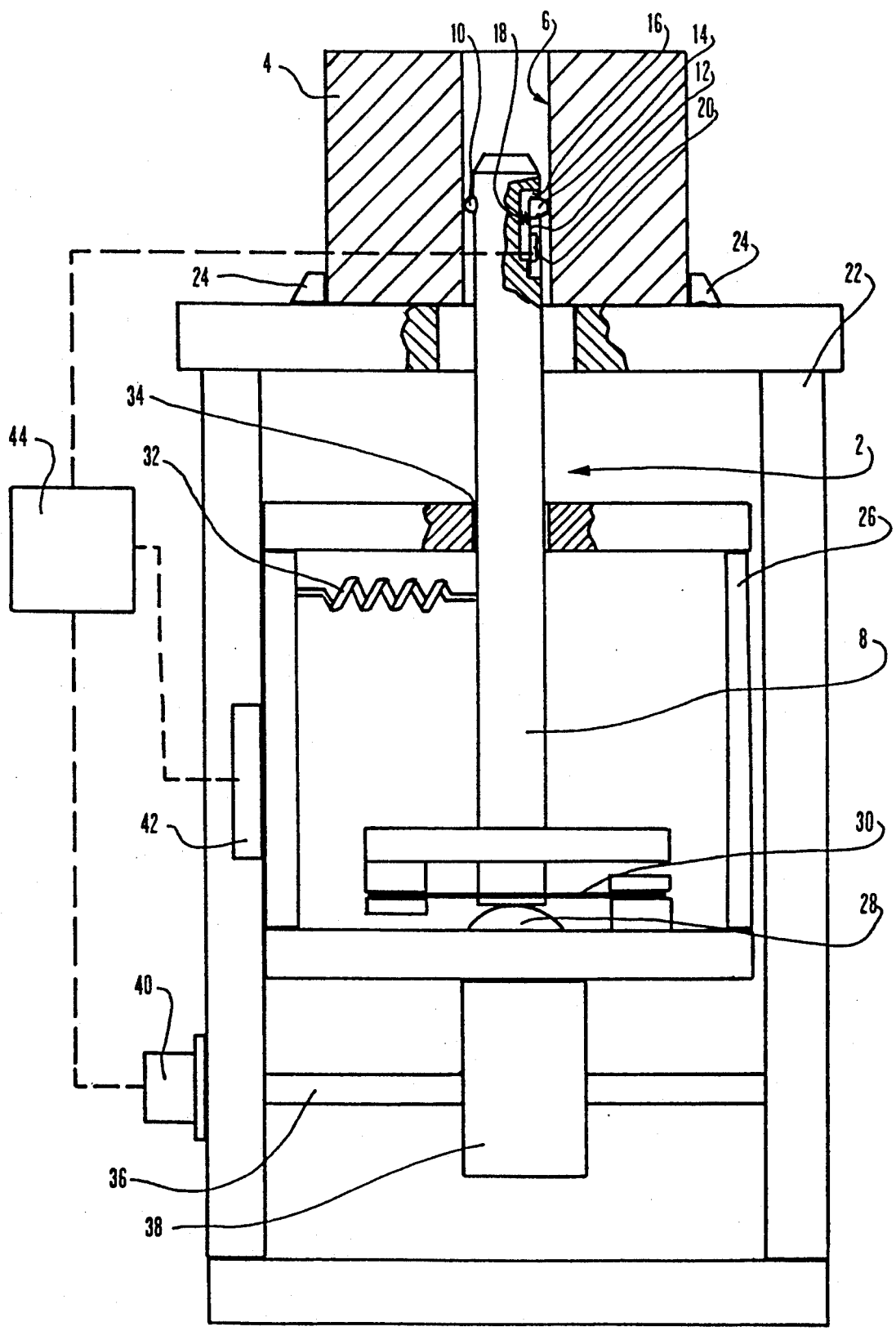
FIG. 1 is a schematic view of an apparatus according to the preferred embodiment of the invention.

The schematic drawing of FIG. 1 shows a gauging head, in particular a plug gauge device 2, for checking internal diametral dimensions of a part 4 featuring an opening that defines a cylindrical surface 6. The device 2 comprises a substantially cylindrical plug casing 8 defining a longitudinal axis, a feeler 10 fixed to casing 8, an elongate element 12 fixed at an end into a seat 16 of casing 8 and with a free end adapted to perform limited rotational displacements about a flexible section of element 12 defining a rotation geometric axis transversal with respect to casing 8, and a movable feeler 14 fixed to said free end of element 12. The feelers 10 and 14 are located in diametrically opposite positions with respect to plug casing 8, while a spring 18 is housed within seat 16 and acts on element 12 for urging feeler 14 against surface 6.

Transducer means comprise a strain gage, schematically shown in FIG. 1 and denoted by reference numeral 20, which is connected to element 12 in a known° manner (for example as described in the above mentioned application WO-A-89/03507), for detecting the rotational displacements of feeler 14, with respect to casing 8, about the transversal axis.

Support and reference means comprise a structure 22 carrying datums 24 for part 4 and a support and guide element with a frame 26, which carries plug device 2 and can translate on the structure along a longitudinal direction. In particular, a pivoting joint, coupling plug casing 8 to frame 26, permits rotational displacements of the plug casing on the frame about an axis perpendicular to the plane of FIG. 1, for the proper contact between feelers 10, 14 and surface 6, and comprises an axially arranged spheric support 28, a flat lamina 30, a return spring 32 and a guide opening 34. Actuating means for causing translations of frame 26 with respect to structure 22 comprise a rotatable shaft 36, a cam 38 secured to the shaft and cooperating with frame 26 and a motor 40 coupled to shaft 36. Detecting means with a linear position transducer 42 measure the position of frame 26 along structure 22.

Processing and control means comprise a unit 44 connected to strain gage 20, motor 40 and linear transducer 42.

Figure 2:
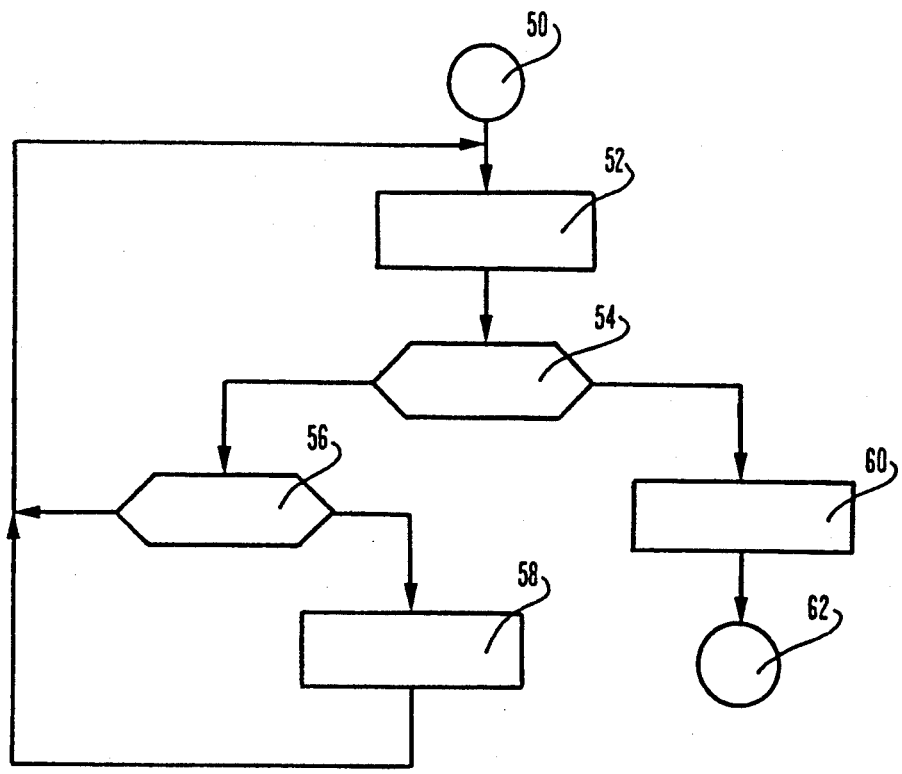
FIG. 2 is a flow chart showing the main steps and their logic sequence of a method according to a first embodiment of the invention.

The meaning of the boxes of the flow chart of FIG. 2 is as follows.
- 50:start of the checking cycle, when the plug gauge is in a rest position;
- 52:actuation of motor 40 for controlling the longitudinal translation of frame 26;
- 54:control and detection, by means of the signal of linear transducer 42, of the return to the rest position;
- 56:control and detection, by means of the signal of linear transducer 42, of the passage of the feelers 10, 14 in correspondence with a diameter to be checked;
- 58:control for detecting the signal of transducer means 20 and for memorizing the relevant value in unit 44;
- 60:processing, in unit 44, of the memorized values; and
- 62:end of the checking cycle.

The operation of the apparatus of FIG. 1 in accordance with the flow chart of FIG. 2 is as follows.

A standard part, or "master", is at first loaded onto structure 22 and positioned between datums 24 for carrying out the operations necessary to zero-set gauging head 2, according to a procedure quite similar to that subsequently used in the checking phase (FIG. 2) and which is explained hereunder.

A part 4 to be checked is then loaded onto structure 22 between datums 24 and the checking cycle is started (box 50).

Unit 44 controls motor 40, which causes the advance of frame 26 towards part 4 (box 52). Plug casing 8 enters into the opening of part 4 and feelers 10 and 14, due to the pivoting coupling between plug casing 8 and frame 26 and the action of spring 32, contact cylindrical surface 6 in diametrically opposite positions. Frame 26 continues its motion, during which feelers 10 and 14 slide along diametrically opposite generating lines of surface 6. In particular, the friction to which moving feeler 14, urged by spring 18, is subjected applies longitudinal strains to elongate element 12 and strain gage 20. Unit 44 stores the value of the signal provided by the transducer means 20 (box 58) when, as indicated by the measurement provided by transducer 42, feelers 10 and 14 are in correspondence with the checking position (box 56). The motion of frame 26 along the initial direction continues (box 52) and the direction of the motion is reversed only when reaching an end stop position defined by the shape and the angular position of cam 38, which is actuated by motor 40 and acts on frame 26. During the translation in the opposite direction, i.e. towards the rest position, the friction acting on the feelers, in particular feeler 14, causes in elongate element 12 and strain gage 20 longitudinal strains equal to those mentioned above, but of opposite sign. Unit 44 stores the value of the signal from strain gage 20 (box 58) when—through linear transducer 42—the second passage of feelers 10, 14 on the checking position is detected (box 56). The motion of frame 26 further continues (box 52) up to the return to the rest position (box 54). Unit 44 processes the two stored values obtaining their average (box 60) and the checking cycle ends (box 62).

Figure 3:
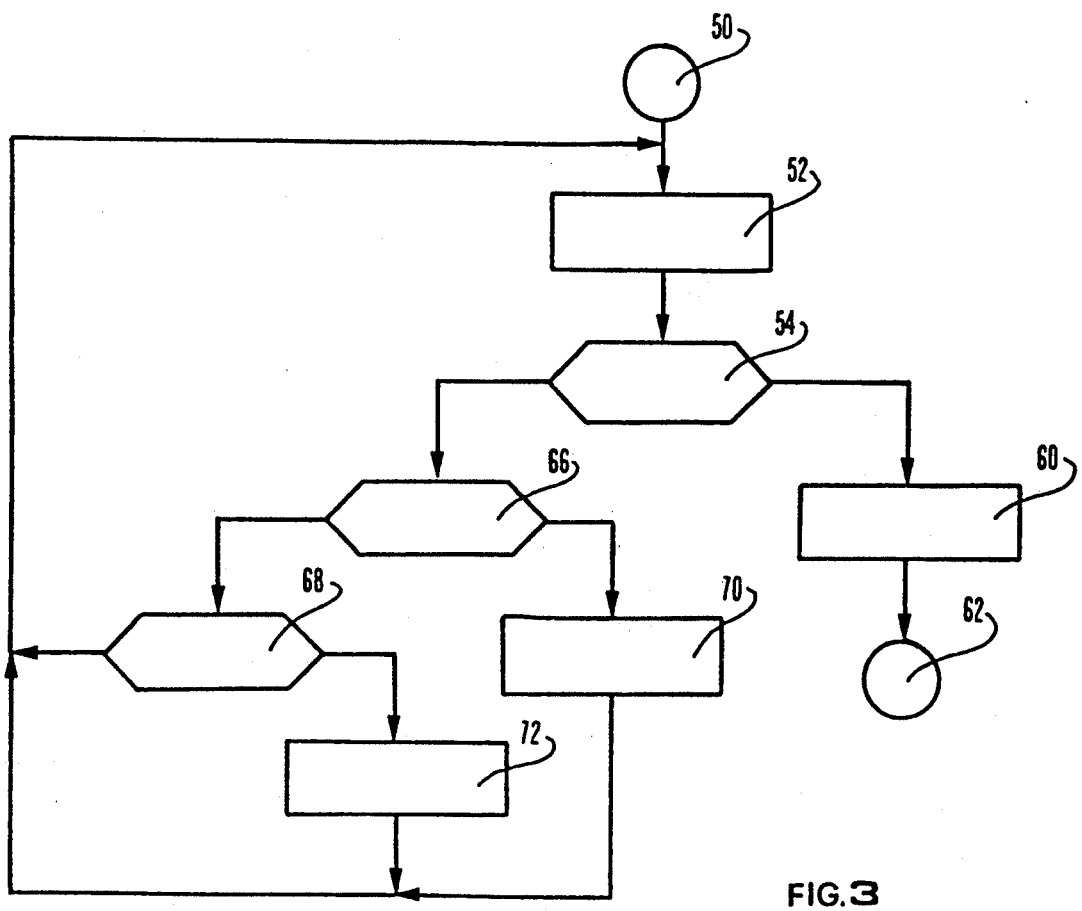
FIG. 3 is a second flow chart showing the main steps, in logic sequence, of another method according to the preferred embodiment of the invention.

The flow chart of FIG. 3 refers to an operation of the apparatus featuring some steps different from those of FIG. 2. In particular, boxes 56 and 58 of FIG. 2 are replaced by boxes having the following meaning:
- 66:control and detection, through the signal of linear transducer 42, of the presence of feelers 10, 14 at a portion of surface 6 having predetermined length L and including the cross-section defining the diameter to be checked;
- 68:control and detection, through the signal of linear transducer 42, of the removal of feelers 10, 14 from said portion of surface 6 with reference to the preceding passage;
- 70:control for detecting the signal of the transducer means 20 and storing the relevant value in unit 44 (quite similar to box 58);
- 72:processing, in unit 44, of the previously memorized values (box 70).

The differences in the operation of the apparatus of FIG. 1 according to the flow chart of FIG. 3, with respect to the preceding explanations referred to FIG. 2, relate, substantially, to the manner of detecting the signal during the sliding of the feeler 14 on surface 6, in each of the opposite directions along the same longitudinal path. In particular, instead of detecting the value of the signal of strain gage 20 during two single passages—one in a direction and the other in the opposite direction—in correspondence of the diameter to be checked, the operation is as follows: two scanning motions of feeler 14 are controlled—one in a longitudinal direction and the other in the opposite longitudinal direction—on a limited portion of surface 6 in which is located the diameter to be checked (boxes 66, 68); a plurality of values of the signal of strain gage 20 is detected (i.e. sampled at a determined frequence f, digitalized and stored) during these scanning motions (box 70); a first and a second mean value are obtained, respectively, by processing the plurality of digital values stored for each scanning motion (box 72). The two mean values obtained by processing according to box 72, are then on their turn stored and subsequently processed (box 60) according to the method of FIG. 2.

It is pointed out that the stresses and deformations which can arise in the arm-set of head 2, in particular in elongate element 12, due to the friction between feeler 14 and surface 6 of part 4 during the mutual sliding motion, cause errors, because are detected by strain gage 20 together with the deformations due to variations of the position of feeler 14, into contact with surface 6, caused by changes of the diameter value. The values of the output signal of transducer means 20, which are responsive to the position of feeler 14 (and therefore to the value of the diameter to be checked), are consequently altered, to an indeterminable extent, by the above mentioned effects of the friction.

By controlling two sliding motions of feeler 14 on surface 6, along opposite directions, the forces due to the dynamical friction caused by said sliding motions are in both cases, in correspondence with a same point or a same portion of surface 6, equal for value, parallel and of opposite sign. The variation introduced by said friction on the output signal of strain gage 20 is in both cases of equal values and of opposite signs, although its value cannot be determined.

By detecting the signal of the transducer means 20 during these two sliding motions, in correspondence with the same point (or of the same portion) to be checked, as occur according to the above described method, and by processing the signal for obtaining, substantially the algebraic mean of the relevant values, the alterations introduced by the friction are mutually compensated, and the desired value, corresponding to the deviation between the values of the diameters of the part and of the master, can be easily obtained.

As already pointed out, the method according to the invention is also applied, at first, for zero-setting the checking apparatus. To this purpose, the steps referred to in FIG. 2 or FIG. 3 are performed by using, as part 4, a master part and, after the processing step 60, a further step is carried out, i.e. that of zero-setting checking head 2 depending on the known value of the dimension of the master part corresponding to that to be checked on part 4 and the value measured by applying the method to the master part. This step can be carried out automatically or manually in ways known per se and therefore is not explained in detail.

Of course, the method can be applied for checking, by one or more gauging heads, a plurality of dimensions (having the same or different nominal values) on the same part and for carrying out the corresponding zero-setting. Accordingly, the method can be repeated for each dimension to be checked and for groups of dimensions, or all of the dimensions can be checked in a single cycle by repeating, with the proper sequence, the necessary steps for each dimension.

The validity and the importance of the above described method are remarkable, among other things, for checkings performed by small gauging heads, comprising very sensitive arm-sets made of light and flexible materials (as elongate element 2 of FIG. 1) and that in any case are easily subjected to resilient deformations.

The method according to the present invention permits checkings of very high accuracy and repeatability. For example, an application with an apparatus substantially similar to that schematically shown in FIG. 1 can provide accuracies in the range of the hundredth of micrometer.

A possible variant of the apparatus of FIG. 1 can foresee the use of a plug gauge with two stationary feelers and a movable feeler, arranged at 120° from one another about the axis of plug casing 8 for cooperating with a transversal cross-section of the hole. In this case, the coupling of plug casing 8 to frame 26 must be made in a different way, to permit displacements of the feelers on the plane of the cross-section.

Of course, the method according to the invention is not limited to the use of plug gauges, as per the illustrated and described example, and can be utilized for any type of checkings with contact, e.g. checkings of external diameters, thickness, etc., that involve the use of checking (or measuring) devices different from the illustrated head 2.

Of course, the actuating means of FIG. 1, with the cam 38 cooperating with frame 26, the relevant shaft 36 and motor 40, are only a special embodiment of means for obtaining the translation movement of the head in two opposite directions and do not limit in any way the proper use of the invention.

As an alternative, the translation of frame 26 can, for example, be controlled in a first direction by a motor differently arranged, the reaching of a limit stop can be detected by the signal of linear transducer 42, and the motor can be controlled to invert the direction of the translation.

On the other hand, the use of linear transducer 42 for obtaining the detecting means does not limit the application of the present method. The functions of said transducer can be performed by different devices, such as, for example, proximity sensors for detecting determined positions of cam 38 or frame 26, etc.

The invention can also be applied to perform dynamical checkings involving mutual displacements, between the checking or measuring means and the part, different from translation movements. Thus, these mutual displacements can be rotational displacements, displacements along helical paths, etc.

For example, in the case of rotational mutual displacements, a plug gauge device can scan a small arc on a circular cross-section of a cylindrical surface of a part by controlling a clockwise mutual motion and then a counter-clockwise mutual motion between the plug gauge and the part. In correspondence with said arc, that can be located by a rotary transducer or in similar way, measurement values are digitally sampled, stored and then averaged substantially as described with reference to FIG. 2 or FIG. 3.

In order to obtain measurement cycles of a short duration, the mutual speed between the checking means and the part can have different values, in particular the approach towards the part portion/s to be checked can be performed with a first (average) speed $V_1$ and the scanning of said portion/s with a considerably lower speed $V_2$. The variation of speed can be obtained by using properly shaped cams (like cam 38 in FIG. 1), by electronically programmable control means, etc.

Generally, the values of the length L of the portion/s (of the path/s) scanned by the checking means at the speed $V_2$, of the speed $V_2$ between the checking means and the part during the scanning motion on the portion/s to be checked, and of the sampling frequence f (for the signal relating to each movable feeler) are chosen, preferably, in the following ranges:

$$0.2 \leq L \leq 1 \text{ mm}$$

$0.2 \leq V_2 \leq 2$ mm/sec $100 \leq f \leq 2000$ Hz

Preferred values are as follows: L=0,5 mm; $V_2$=1 mm/sec; f=500 Hz.

The value of the contacting force F between each feeler and the surface of the part is chosen, preferably, in the range between 0,1 and 1 N.

I claim:

1. A method for checking dimensions of a mechanical part by means of a checking head (2) including a casing (8), at least a feeler (14) movable with respect to the casing (8) and adapted to contact a surface (6) of the part (4), and transducer means (20) for providing a signal responsive to the position of the feeler (14), the method comprising the steps of:

controlling a mutual displacement between the checking head (2) and the part (4) so as to obtain a first mutual sliding motion between the feeler (14) and the surface (6) of the part, towards a determined portion to be checked, along a predetermined scanning path (52) of the surface (6);

detecting a first passage of the feeler (14) at said determined portion (56; 66, 68) to be checked; and detecting the signal provided by the transducer means (20) in correspondence with said first passage (58; 70), characterized by the following further steps:

controlling a further displacement between the checking head (2) and the part (4) in order to cause a second mutual sliding motion between the feeler (14) and the surface (6) of the part, towards said determined portion to be checked, along the same scanning path of the surface (6), the second mutual sliding motion being performed in the direction opposite to that of the first mutual sliding motion (52);

detecting, during the second mutual sliding motion, a passage of the feeler (14) at said determined portion to be checked (56; 66, 68);

detecting the signal provided by the transducer means (20) in correspondence with said second passage (58; 70); and processing the values of the signal detected during said first and second passage for obtaining a final measurement value depending on the dimension of said determined portion to be checked (60).

2. The method according to claim 1, wherein the mutual displacement between the checking head (2) and the part (4) is performed with an average approach speed ($V_1$) and a considerably lower scanning speed ($V_2$), the scanning speed having a value comprised between 0,2 and 2 mm/sec.

3. The method according to claim 2, wherein the portion of said path scanned at the scanning speed has a length (L) comprised between 0,2 and 1 mm.

4. The method according to claim wherein said first and second mutual sliding motions are motions of linear translation.

5. The method according to claim wherein said first and second mutual sliding motions are rotational motions.

6. A method for checking dimensions of a mechanical part by means of a checking head (2) including a casing (8), at least a feeler (14) movable with respect to the casing (8) and adapted to contact a surface (6) of the part (4), and transducer means (20) for providing a signal responsive to the position of the feeler (14), the method comprising the steps of:

controlling a mutual displacement between the checking head (2) and the part (4) so as to obtain a first mutual sliding motion between the feeler (14) and the surface (6) of the part, towards, a portion to be checked, along a predetermined path (52);

detecting a first passage o the feeler (14) at the portion (56; 66, 68) to be checked; and detecting the signal provided by the transducer means (20) in correspondence with said first passage (58; 70), characterized by the following further steps:

controlling a further displacement between the checking head (2) and the part (4) in order to cause a second mutual sliding motion between the feeler (14) and the surface (6) of the part, towards said portion to be checked, along said path, the second mutual sliding motion being performed in the direction opposite to that of the first mutual sliding motion (52);

detecting, during the second mutual sliding motion, a second passage of the feeler (14) at the portion to be checked (56; 66, 68);

detecting the signal provided by the transducer means (20) in correspondence with said second passage (58; 70); and processing the values of the signal detected during said first and second passage, said processing step (60) including calculating an average between said values, said average being indicative of the value of the dimension to be checked.

7. The method according to claim 6, wherein said steps of detecting a passage and a second passage of the feeler (14) at the portion to be checked and of detecting the signal provided by the transducer means (20) include the steps of detecting (56) the passage and the second passage of the feeler (14) in correspondence with a checking position and of detecting (58) a first and a second value of the signal provided by the transducer means in correspondence with said checking position, said first and second measurement values being detected during, respectively, said first and second passages of the feeler (14).

8. The method according to claim 6, wherein said steps of detecting the passage and the second passage of the feeler (14) at the portion to be checked, detecting the signal provided by the transducer means (20) and processing the values of the signal include the steps of detecting (66, 68) the passage and the second passage of the feeler (14) on a portion of the surface comprising a checking position, detecting and memorizing (70) a first and a second plurality of the relevant values of the signal of the transducer means (20) during said first passage and second passage, and processing (72) said first and second plurality for obtaining said average.

9. The method according to claim 8, wherein said first and second plurality of values are sampled at a frequence (f) comprised between 100 and 2000 Hz.

10. The method according to claim 9, wherein the step of processing said first and second plurality comprises calculating (72), respectively, a first average value and a second average value of said pluralities of values.

11. A method, for checking dimensions of a mechanical part by means of a checking head (2) including a casing (8), at least a feeler (14) movable with respect to the casing (8) and adapted to contact a surface (6) of the part (4), and transducer means (20) for providing a signal responsive to the position of the feeler (14), the method comprising the steps of:

controlling a mutual displacement between the checking head (2) and the part (4) so as to obtain a first mutual sliding motion between the feeler (14) and the surface (6) of the part, towards a portion to be checked, along a predetermined path (52);

detecting a first passage of the feeler (14) at the portion (56; 66, 68) to be checked; and detecting the signal provided by the transducer means (20) in correspondence with said first passage (58; 70), characterized by the following further steps:

controlling a further displacement between the checking head (2) and the part (4) in order to cause a second mutual sliding motion between the feeler (14) and the surface (6) of the part, towards said portion to be checked, along said path, the second mutual sliding motion being performed in the direction opposite to that of the first mutual sliding motion (52);

detecting, during the second mutual sliding motion, a second passage of the feeler (14) at the portion to be checked (56; 66, 68);

detecting the signal provided by the transducer means (20) in correspondence with said second passage (58; 70);

processing the values of the signal detected during said first and second passage for obtaining a final measurement value depending on the dimension to be checked (60); and wherein the method additionally includes carrying out all of the preceding steps by using a master part in place of a part to be checked, for zero-setting the checking head.

12. An apparatus for automatically checking linear dimensions of a mechanical part (4), with:

a checking head (2) including a casing (8), at least a feeler (14) movable with respect to the casing (8) to contact the surface of the part (4) and transducer means (20) for providing a signal responsive to the position of the feeler (14) with respect to the casing (8), driving means (36, 38, 40) for obtaining a first mutual displacement between the checking head (2) and the part (4) along a determined path, processing and control means (44) connected to the transducer means (20) and the driving means (40) for controlling said mutual displacements and for performing a first detection and processing of the signal of the transducer means (20), characterized in that the processing and control means (44) and the driving means (36, 38, 40) and also adapted for:

controlling a second mutual displacement between the checking head (2) and the part (4) along said path, the second displacement being performed in a direction opposite to that of the first mutual displacement, and wherein substantially the same points of the surface of the part (4) are scanned by said feeler (14) during said first and second mutual displacement along said path, performing a second detection and processing of the signal of the transducer means (20), and processing the results of said first and second processing for obtaining a value responsive to the dimension to be checked.

13. The apparatus according to claim 12, wherein said transducer means include at least a strain gage (20).

14. An apparatus for automatically checking linear dimensions of a mechanical part (4), with:

a checking head (2) including a casing (8), at least a feeler (14) movable with respect to the casing (8) and transducer means (20) for providing a signal responsive to the position of the feeler (14) with respect to the casing (8), driving means (36, 38, 40) for obtaining a first mutual displacement between the checking head (2) and the part (4) along a determined path, processing and control means (44) connected to the transducer means (20) and the driving means (40) for controlling said mutual displacements and for performing a first detection and processing of the signal of the transducer means (20), characterized in that the processing and control means (44) and the driving means (36, 38, 40) are also adapted for:

controlling a second mutual displacement between the checking head (2) and the part (4) along said path, the second displacement being performed in a direction opposite to that of the first mutual displacement, performing a second detection and processing of the signal of the transducer means (20), processing the results of said first and second processing for obtaining a value responsive to the dimension to be checked, and wherein the apparatus further comprises support and reference means (22, 24) for the part (4), a support element (26) carrying the checking head (2), the support means (22) and the support element (26) being mutually movable along said path, the driving means (36, 38, 40) cooperating with the support means (22) and the support element (26) for obtaining said mutual displacements between the checking head (2) and the part (4), detecting means (42) for detecting the mutual position between the checking head (2) and the part (4) along said path, the processing and control means (44) being also connected to the detecting means (42) for obtaining a first and a second measurement value in correspondence with a same portion, to be checked, of the part (4).

15. The apparatus according to claim 14, for checking internal diametral dimensions, wherein the checking head includes a plug gauge device (2) coupled to the support element (26) and carrying at least an elongate movable element (12) substantially arranged along a longitudinal direction, the feeler (14) being fixed to said movable element (12), the transducer means including a strain gage (20) coupled to the movable element (12).

* * * * *

UNITED STATES PATENT AND TRADEMARK OFFICE
CERTIFICATE OF CORRECTION

PATENT NO. : 5,205,047
DATED : April 27, 1993
INVENTOR(S) : Franco DANIELLI It is certified that error appears in the above-identified patent and that said Letters Patent is hereby corrected as shown below:

Column 8, line 6, the comma after "towards" should be deleted.
Column 8, line 8, "o" should be --of--.
Column 9, line 54, "and" (second occurrence) should be --are--.
Title Page, [56] References Cited, the following should be
 included:   -- OTHER DOCUMENTS PATENT ABSTRACTS OF JAPAN, Vol. 10, No. 364
             (P-524)[2421] 12/1986

PATENT ABSTRACTS OF JAPAN, Vol. 11, No. 103
             (P-562) [2550] 4/1987 --

Signed and Sealed this

Fifteenth Day of March, 1994

Attest:

BRUCE LEHMAN

Attesting Officer    Commissioner of Patents and Trademarks